(12) United States Patent
Tolskyakov et al.

(10) Patent No.: US 7,747,899 B2
(45) Date of Patent: Jun. 29, 2010

(54) PROVIDING MAPPING FAULT PROCESSING

(75) Inventors: Andrey Tolskyakov, Redmond, WA (US); Mohammed Fadel Shatnawi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 11/768,735

(22) Filed: Jun. 26, 2007

(65) Prior Publication Data

US 2009/0006441 A1    Jan. 1, 2009

(51) Int. Cl.
*G01F 11/00* (2006.01)
(52) U.S. Cl. ......................................... 714/16; 714/57
(58) Field of Classification Search .................... 714/16
See application file for complete search history.

(56) References Cited

U.S. PATENT DOCUMENTS

| | | | | |
|---|---|---|---|---|
| 5,627,979 | A | 5/1997 | Chang et al. | 395/335 |
| 5,692,169 | A * | 11/1997 | Kathail et al. | 712/244 |
| 5,729,739 | A | 3/1998 | Cantin et al. | 395/614 |
| 5,737,601 | A * | 4/1998 | Jain et al. | 707/201 |
| 5,809,505 | A | 9/1998 | Lo et al. | 707/102 |
| 5,878,411 | A | 3/1999 | Burroughs et al. | 707/4 |
| 5,937,409 | A | 8/1999 | Wetherbee | 707/103 |
| 5,940,587 | A * | 8/1999 | Zimmer | 714/25 |
| 5,940,839 | A | 8/1999 | Chen et al. | 707/202 |
| 5,956,725 | A | 9/1999 | Burroughs et al. | 707/101 |
| 6,101,502 | A | 8/2000 | Heubner et al. | 707/103 |
| 6,233,585 | B1 | 5/2001 | Gupta et al. | 707/103 |
| 6,363,435 | B1 * | 3/2002 | Fernando et al. | 719/318 |
| 6,434,628 | B1 * | 8/2002 | Bowman-Amuah | 714/48 |
| 6,526,416 | B1 | 2/2003 | Long | 707/202 |
| 6,704,862 | B1 * | 3/2004 | Chaudhry et al. | 712/244 |
| 6,738,975 | B1 | 5/2004 | Yee et al. | 719/310 |
| 6,971,051 | B2 * | 11/2005 | Taylor et al. | 714/718 |
| 6,996,566 | B1 | 2/2006 | George et al. | 707/100 |
| 7,020,880 | B2 * | 3/2006 | Mellen-Garnett et al. | 719/310 |
| 7,047,243 | B2 | 5/2006 | Cabrera et al. | 707/10 |
| 7,127,474 | B2 | 10/2006 | Williamson et al. | 707/103 |
| 7,149,730 | B2 | 12/2006 | Mullins et al. | 707/2 |

(Continued)

FOREIGN PATENT DOCUMENTS

WO    WO 2004/003745 A2    1/2004

OTHER PUBLICATIONS

International Search Report dated Dec. 19, 2008 cited in Application No. PCT/US2008/067836.

(Continued)

*Primary Examiner*—Scott T Baderman
*Assistant Examiner*—Kamini Patel
(74) *Attorney, Agent, or Firm*—Merchant & Gould (57) ABSTRACT

Mapping fault processing may be provided. First, user selectable elements may be received defining a process comprising a plurality of activities. Next, code may be produced, based on the received user selectable element, configured to implement the process. Then the code may be executed and an exception may be detected during the code execution. The exception may be scheduled in a queue and one of the following may be performed: handling the exception and compensating for the exception. Handing the exception may comprise undoing one of the plurality of activities that was partially completed and unsuccessful. Compensating for the exception may comprise undoing one of the plurality of activities that was completed.

20 Claims, 4 Drawing Sheets

U.S. PATENT DOCUMENTS

| | | | |
|---|---|---|---|
| 7,171,585 B2 | 1/2007 | Gail et al. | 714/25 |
| 7,200,530 B2 | 4/2007 | Brown et al. | 703/1 |
| 7,606,681 B2* | 10/2009 | Esmaili et al. | 702/187 |
| 2005/0021355 A1* | 1/2005 | Brendle et al. | 705/1 |
| 2005/0027575 A1 | 2/2005 | Amitabh et al. | 705/8 |
| 2005/0097187 A1 | 5/2005 | Thompson et al. | 709/217 |
| 2006/0029054 A1 | 2/2006 | Breh et al. | 370/385 |
| 2006/0277024 A1 | 12/2006 | Kloppmann et al. | 703/22 |
| 2007/0006237 A1 | 1/2007 | Ghanaie-Sichanie et al. | 719/328 |
| 2007/0055692 A1 | 3/2007 | Pizzo et al. | 707/103 R |
| 2007/0179975 A1* | 8/2007 | Teh et al. | 707/104.1 |
| 2007/0283146 A1* | 12/2007 | Neveux | 713/166 |
| 2008/0127205 A1* | 5/2008 | Barros | 719/313 |
| 2009/0006440 A1 | 1/2009 | Tolskyakov et al. | 707/102 |
| 2009/0006908 A1* | 1/2009 | Allen | 714/57 |

OTHER PUBLICATIONS

International Search Report dated Dec. 19, 2008 cited in Application No. PCT/US2008/067559.

Bartek Kiepuszewski et al., "FlowBack: Providing Backward Recovery for Workflow Management Systems," DST Technical Report, DSTC-TR-9840, 7 pgs., http://citeseer.ist.psu.edu/cache/papers/es/4522/ http:/SzzSzwww.dste.edu.auzSzD-DUzSzpublicationszSztech-reportszSzTR-9840.pdfkrepuszewskt98flowback.pdf.

A. Bilins et al., "ASSET: A System for Supporting Extended Transactions," SIGMOD 94-5 94 Minneapolis, MN. 1994, pp. 44-54, http://deliver.acm.org__10__1145.200000__191848/p44-bilins.pdf.key1__191848&key2__6889097711&col__GUIDE&dl__GUIDE&CFID__21288866&CFTOKEN__93794674.

Mark Potts et al., "Business Transactions in Workflow and Business Process Management," OASIS Business Transactions Technical Committee Workflow sub-committee, 2001, pp. 1-14, http://www.ift.uno.no/indis/v2002/handouts2001-07-12BTPModelForWF2.pdf.

Huanqing Lu, "Implementation of an Advanced Transaction Model for an Integrated Computing Environment for Building Construction," 2002, 85 pgs, http://etd.fela.eduUFUFE1000138tu__h.pdf.

Jürg Gutknecht, "Active Oberon for .NET: A Case Study in Object Model Mapping," pp. 1-22, Aug. 10, 2001, http://www.cs.inf.ethz.ch/~gutknech/AODotNet.pdf.

"Client-Server Object Issues," 4 pgs., 1997-2000, http://www.chimu.com/publications/objectRelational/part0007.html.

Michael Rys et al., "Intra-Transaction Parallelism in the Mapping of an Object Model to a Relational Multi-Processor System," Proceedings of the $22^{nd}$ VLDB Conference Mumbai (Bombay), India, 1996, pp. 460-471, http://www.sigmod.org/vldb/conf/1996/P460.PDF.

* cited by examiner

PROVIDING MAPPING FAULT PROCESSING

RELATED APPLICATION

Related U.S. patent application Ser. No. 11/768,628, filed on Jun. 26, 2007 in the name of Andrey Tolstyakov and entitles "Object Model Based Mapping," assigned to the assignee of the present application, is hereby incorporated by reference.

BACKGROUND

An independent software vendor (ISV) is a business term for companies specializing in making or selling specialized software products, usually for niche markets composing, for example, real estate brokers, scheduling for healthcare personnel, barcode scanning, and stock maintenance. Specialized software products generally offer higher productivity to organizations than more generalized software such as baste spreadsheet or database packages.

Most large software companies offer special programs for ISVs. Consequently, an ISV may make and sells software products that run on one or more computer hardware or operating system platforms made by the large software companies. The large software companies that make the platforms, encourage and lend support to ISVs, often with special "business partner" programs. In general, the more applications that run on a platform, the more value it offers to customers. Of course, platform manufacturers make applications as well, but do not have the resources and, in many cases, the special knowledge required to make them all.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Mapping fault processing may be provided. First, user selectable elements may be received defining a process comprising a plurality of activities. Next, code may be produced, based on the received user selectable elements, configured to implement the process. Then the code may be executed and an exception may be detected during the code execution. The exception may be scheduled in a queue and one of the following may be performed: handling the exception and compensating for the exception. Handling the exception may comprise undoing one of the plurality of activities that was partially completed and unsuccessful. Compensating for the exception may comprise undoing one of the plurality of activities that was completed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Conceptual entity programming is an emerging, trend that ISVs are trying to use to overcome the problems of specific implementation and data access of databases and database technologies like customer relationship management (CRM). CRM is a term that covers concepts used by companies to manage their relationships with customers, including capture, storage, and analysis of customer information. Consistent with embodiments of the invention, a programming model that enables mapping a conceptual (entity) model to a backend may be provided. The backend may be, for example, a conceptual model itself, a relational database, or a set of application program interfaces (APIs). There may be no restrictions on the nature of the backend. Embodiments of the invention may have the following behavior to enable mapping between an entity model and a backend: i) ability to define both endpoints (e.g. entity model and backend); ii) ability to understand the properties, predicates, and behaviors of conceptual model, and translate those into pertinent functionality to be performed on the backend; iii) ability to customize a solutions provided for a specific design/implementation, of a conceptual model and a specific type/version of the backend; iv) ability to customize at both a design time end/or runtime of a solution; and v) ability to package the solutions, ship, or deploy them independent of the backends.

For ISVs that define such a conceptual abstraction known as in entity model, the ability to map data between their abstract constructs known as entities (e.g. entity classes, data logical classes, etc.) and data constructs of backend systems their going against is desired. Such a mapping may include: i) data type transformation (e.g. strings to guides, integers to strings, concatenation of types, any mathematical transformation on a type, etc.); ii) backend end specification (e.g. which backend to map to, such as a structured query language (SQL) server, Microsoft customer relationship management (MSCRM) server, a SAP CRM server, a Siebel CRM server, etc.); and iii) which method to access the backend (e.g. via data access layers such as ActiveX Data Objects (e.g. Ado-.Net) or Web service facades to the backend).

A problem faced by ISVs is that any ISV solution may not be a viable choice for customers without the ability to customize that solution. Customization may be important because any generic solution may not be what specific customers need for their specific conceptual (i.e. entity) model and their specific backends. Customers may have a different conceptual model, may interact with a different backend, may have different mapping requirements between their conceptual model and the backend, or any possible combination of these.

Figure 1:
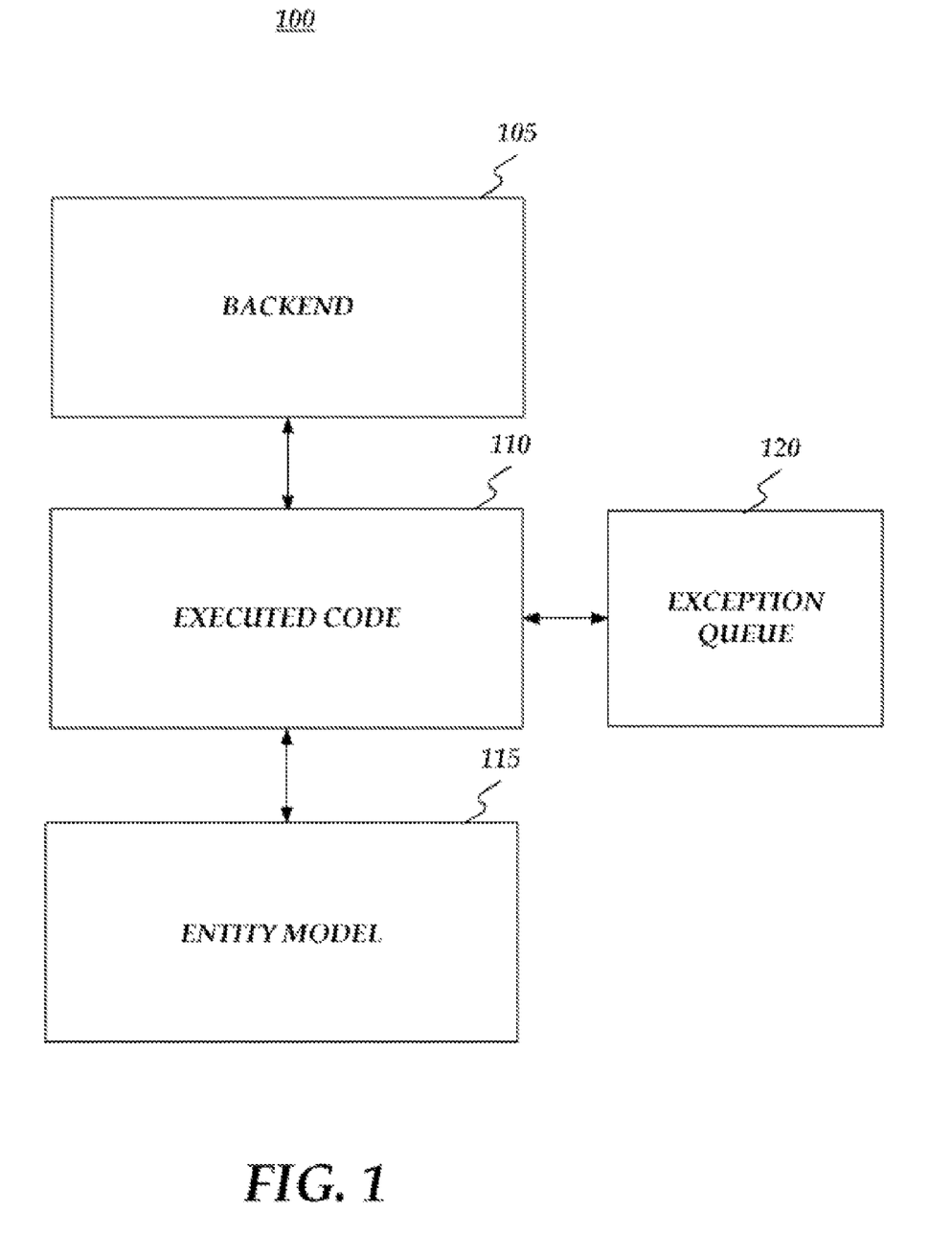
FIG. 1 is a block diagram of an operating environment.

To address the aforementioned problems, (e.g. the mapping problem, design time customization, and runtime customization) embodiments of the invention may include a system and method that allow for the specification of the conceptual model and the backend to interact with as a set of interfaces. FIG. 1 shows a mapping system 100 consistent with embodiments of the invention. As shown in FIG. 1, system 100 may includes a backend 105, a map 110, an entity model 115, and a queue 120. For example, map 110 may include specific mapping predicates that have the ability to: i) define end points for the conceptual model to go against; and ii) define mapping/transformation logic between the two ends (e.g. entity model 115 and backend 105). For example, backend 105 may comprise a legacy banking system using a structured query language (SQL) server. Entity model 115 may comprise a conceptual model corresponding to a remote personal computer configured to perform online banking for example. Map 110 may perform bi-directional data transforms between entity model 115 and backend 106 as described in greater detail below. Queue 120 may be used to store exceptions as described in more detail below.

Moreover, embodiments of the invention may have the following features. First, embodiments of the invention may have the ability to understand the conceptual model's signatures (i.e. as a set of interfaces). In addition, embodiments of the invention may be configured to define and access backend endpoints and to schedule actions and functionality to insure correctness of the mapping, in addition, embodiments of the invention may be configured to supply workflow/runtime like behavior (e.g. scheduling, error handling, event raising, and event handling, etc.). Also, embodiments of the invention may be configured to support programmable customization of the mapping solutions.

In many situations, the conceptual entity defined by customers may span more than one entity in a single backend, or may even span more than one entity on multiple backends. Many backends in conventional systems may not have a rollback behavior on functions performed on their entities (e.g. conventional systems may not be able to delete an account or delete an activity with a customer). Conventional systems may only be able to mark an account as inactive or an activity abandoned.

Because access to backends in conventional systems is a random and independent process (e.g. often done through web service calls or database access methods) a distributed-transaction-like compensation model that may render an inherently distributed conceptual mapping problem to behave like a virtually atomic operation may be desired. Embodiments of the invention may provide a compensation model that may ensure no data loss or corruption occurs. Consequently, embodiments of the invention may allow a rollback-like behavior. For example, a user may create an account on their conceptual model that may translate into multiple backend entity creations on, for example, account and address entities. The creation may be in the same order depleted, for example, account and address. Accordingly, embodiments of the invention may compensate for the account creation if the address creation fails. In other words, embodiments of the invention may provide a rollback-like function between model 115 and backend 105 when a fault occurs.

Figure 2:
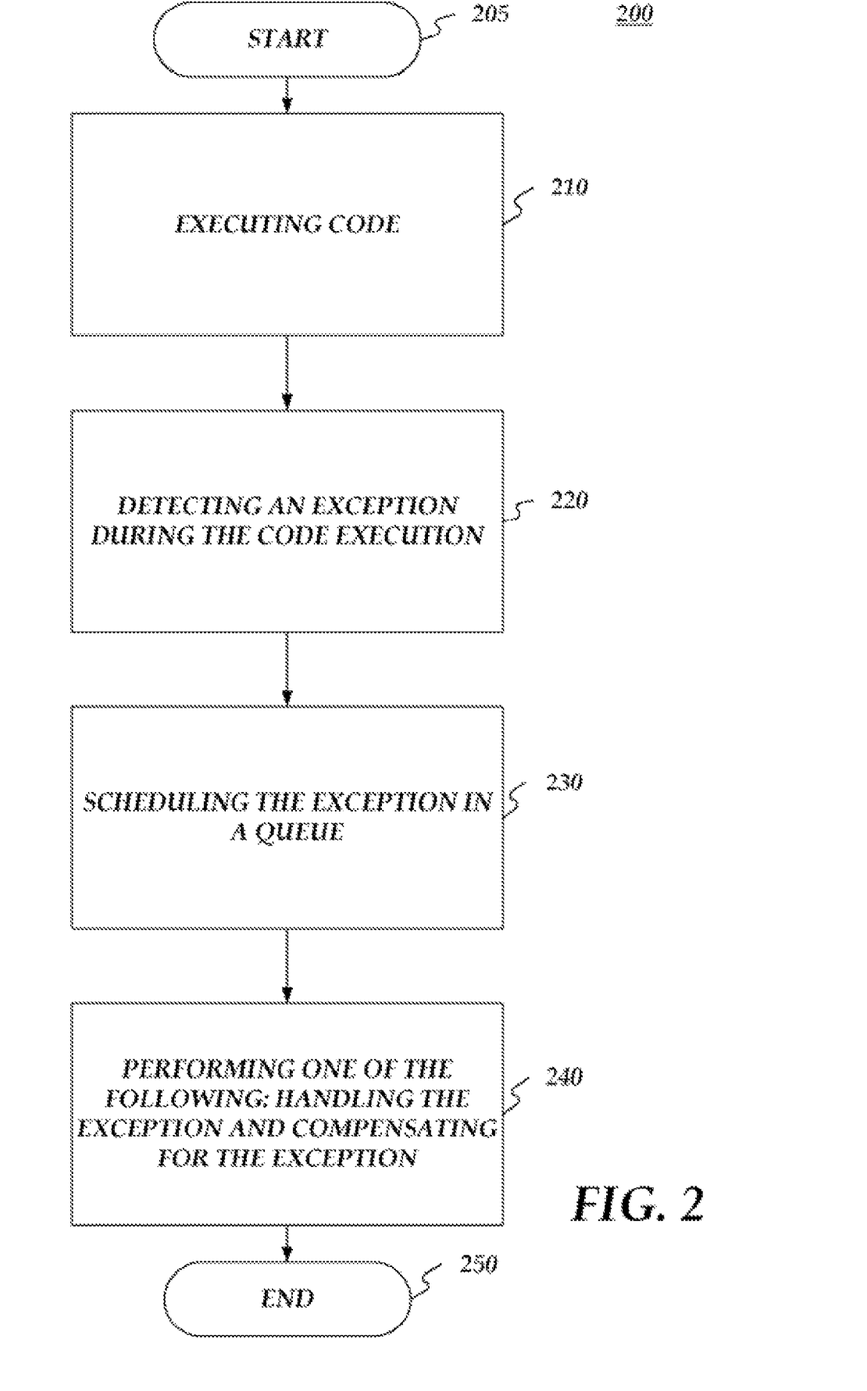
FIG. 2 is a flow chart of a method for providing mapping fault processing.

FIG. 2 is a flow chart setting forth the general stages involved in a method 200 consistent with an embodiment of the invention for providing mapping fault processing. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may execute code. For example, the executed code may comprise code configured to implement a process. The code may be created as described below.

In order to create the code, a computing device 400, as described in greater detail below with resects to FIG. 4, may receive backend data defining data constructs for backend system 105. For example, the backend data may specify any information regarding backend system 105 in order for map 110 to provide object model based mapping between backend 105 and entity model 115. The backend data may specify which backend to map to, such as a structured query language (SQL) server, a Microsoft customer relationship management (MSCRM) server, a SAP CRM server, a Siebel CRM server, etc.). Furthermore, the backend data may specify which method to use to access backend system 105, for example, via data access layers such as ActiveX Data Objects (e.g. Ado-.Net) or Web service facades to backend system 106.

Next, computing device 400 may receive entity data defining data constructs in an entity model. For example, the entity data may specify any information regarding entity model 115 in order for map 110 to provide object model based mapping between backend 105 and entity model 115. For example, the entity data may specify the desired data or the desired data format for the input and output associated with entity model 115. Entity model 115 may comprise a customers conceptual world.

Figure 3:
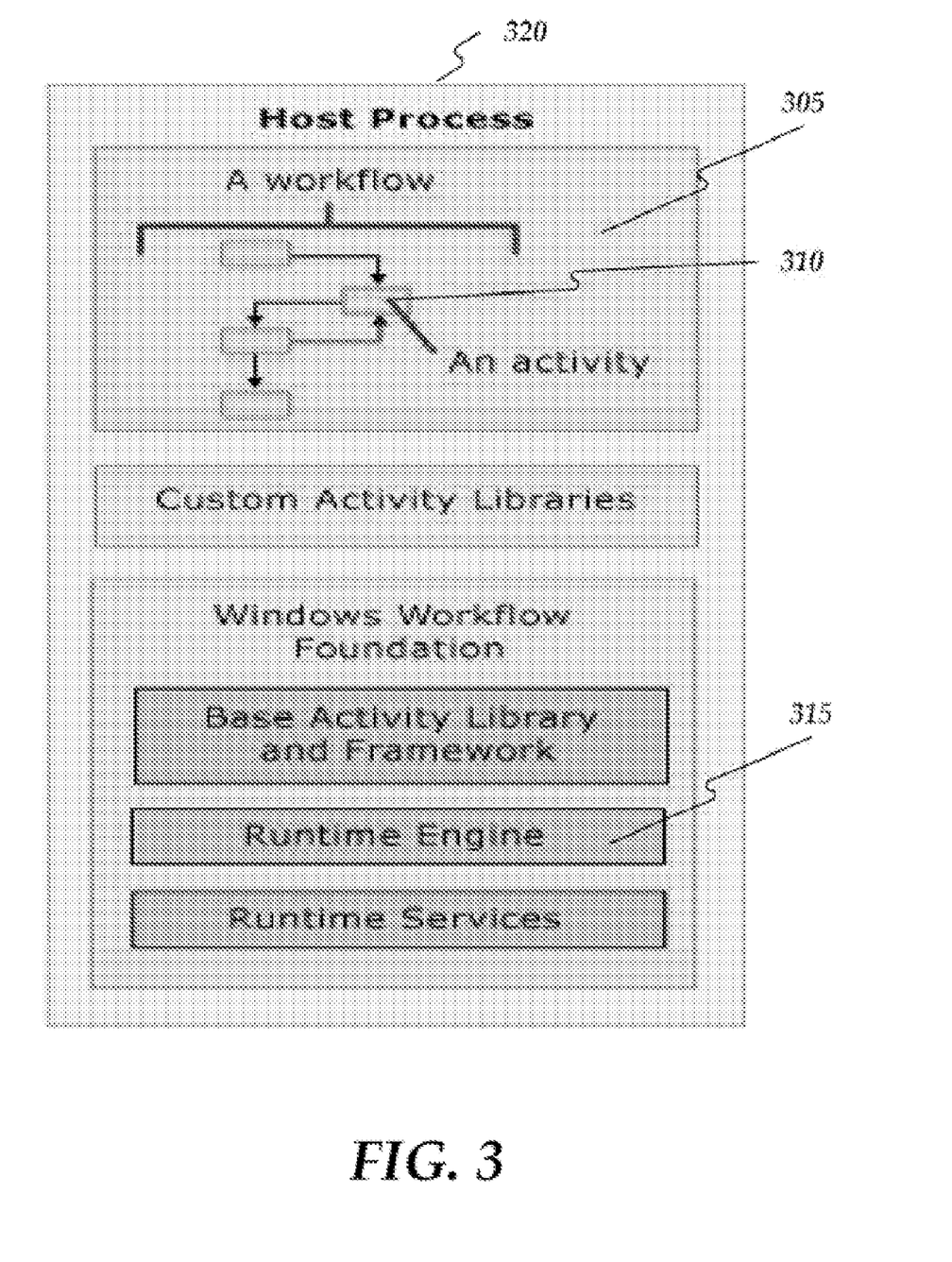
FIG. 3 is a diagram illustrating an object model.

Then computing device 400 may receive user selectable elements defining a process associating the backend data with the entity data. For example, the process may be defined by a flow chart (i.e. workflow) 305 as shown in FIG. 3. In order to define the process, computing device 400 may present a user with an interface configured to receive the user selectable elements defining the process as low chart 305. The selectable elements may comprise activities including, for example, an activity 310. The activities in flow chart 305 may define map 110. As described in greater detail below, flow chart 305 may be translated by computing device 400 from flow chart 505's easy-readable format for human to machine code for computer execution.

In conventional systems, flowcharts and process schemes are done separately from code just as a way to organize ideas before writing the actual code. But when the task was finished in conventional systems, the scheme remained just as documentation. Also, the capacity of older conventional computers made it difficult to retain all the information of a workflow in memory, and it was difficult to translate from an easy-readable format for human to machine code in conventional systems. Software developers may find it easier writing a workflow instead of writing code. First for developers, workflows may be easier to understand than code because workflows may provide a visual representation of the process. For example, adding an activity in flow chart 305 may be easier for a developer to do than re-writing code to include the activity. Consequently, non-programs may be able to write workflows thus producing code without having computer programming skills.

Moreover, there may be two main kinds of workflows: i) sequential; and ii) and state machine. With sequential workflows, actions may be executed in some predefined order with a beginning and an end. Examples of sequential workflows may include installations. With state machine workflows, these workflows may not have a path, but it may be represented as a set of states and transitions between states.

Examples may include a web shop: you may need approval for mailing, the user could pay via credit card or with a cheque, and each user is in one state and may go to any order depending on previous questions.

Next computing device 400 may produce code, based on the received user selectable elements, configured to implement the process. For example, computing device 400 may convert flow chart 305's activities (e.g. describing map 110) to machine code for execution on computing device 400. During execution, the code may perform mapping between entity model 115 and backend 105.

Workflow instances may be created and maintained by an in-process runtime engine, for example, a runtime engine 315. There can be several workflow runtime engines within an application domain, and each instance of the runtime engine can support multiple workflow instances running concurrently. When a workflow model is compiled, it can be executed inside any process including console applications, forms-based applications, Services, ASP.NET Web sites, and Web services. Because a workflow may be hosted in process, a workflow can communicate with is host application. For example, the workflow described in flow chart 305 may communicate with a host application 320.

From stage 210, where computing device 400 executes the code, method 200 may advance to stage 220 when computing device 400 may detect an exception during the code execution. Consistent with embodiments of the invention, fault handling may comprise handling of exceptions in an asynchronous manner. This may mean that exceptions that may be thrown in an activity (e.g. explicitly or implicitly) may be caught by runtime engine 315 and then scheduled in queue 120 to be handled at a later time. This differs from conventional exception handling in that if an exception is thrown in a try block, it may either be caught by an appropriate catch exception block, or it may be thrown to the user immediately. For example, the executed code may be directed toward a user creating an account on their conceptual model (e.g. entity model 115) that may translate into multiple entities on backend 105, for example, account and address entitles. The creation may be in the same order depicted, for example, account and address. Consequently, runtime engine 315 may detect an exception when the address creation fails.

Once computing device 400 detects the exception in stage 220, method 200 may continue to stage 230 where computing device 400 may schedule the exception in queue 120. For example, exceptions that occur in activities may be handled asynchronously by runtime engine 315 in the fault handing process. Exceptions may be scheduled in queue 120 to be handled later. If the exception type matches one that may be handled by a particular FaultHandlerActivity activity, that activity may handle the exception. If the exception cannot be handled, it is "bubbled up" through parent activities in flow chart 306 until it ultimately causes the termination of host application 320.

After computing device 400 schedules the exception in stage 230, method 200 may proceed to stage 240 where computing device 400 may perform handling the exception or compensating for the exception. For example, in fault handling, if the activity that threw the exception cannot handle it, the exception is transferred to its parent activity in flow chart 305 for resolution. The exception is transferred up the workflow hierarchy in low chart 305 until it is either handled, or the workflow instance (the code) is terminated by runtime engine 315.

Handling the exception may be done by a FaultHandlerActivity activity. Each FaultHandlerActivity activity may be associated with, for example, a .NET Framework exception type and may further contain a set of activities that may be executed if the exception raised matches the exception type. A FaultHandlerActivity activity may be parented in a FaultHandlersActivity activity that contains n FaultHandlerActivity activities. The FaultHandlersActivity activity may be a child activity of any composite activity.

Fault handling may undo a partial and unsuccessful work of an activity (e.g. activity 310) in which an exception has occurred. The completion of the FaultHandlerActivity activity may not be considered a successful completion of its associated activity. This may mean that while the FaultHandlerActivity activity is executing, the activity that threw the exception may be put into a faulting state. When the FaultHandlerActivity activity has completed, the associated activity may be put into the closed state. Also, any sibling activates of that associated activity, such as other children of a ParallelActivity activity, may be placed into a canceling state, and then into a closed state. They may never be given the chance to successfully execute.

A difference between fault handling and fault compensation may be that compensation may be performed on an activity that has successfully completed, not one that has thrown an exception and is in a faulting state. However, a CompensateActivity activity (associated with compensation) may be executed inside a FaultHandlerActivity activity that may be associated with an activity that has thrown an exception. An example of this may be when an activity successfully completes, but an exception is thrown in another activity later in the workflow. A fault handler for that activity may contain a CompensateActivity that reverses any actions previously done in the workflow. For example, a monetary refund may be given to a customer after an ItemDiscontinuedException is thrown later in a workflow by another activity. In other words, a customer may be refunded its money after the customer has paid for an item, but it is latter discovered that the paid for item cannot be delivered because it was discontinued. Once computing device 400 performs handling the exception or compensating for the exception in stage 240, method 200 may then end at stage 250.

An embodiment consistent with the invention may compose a system for providing mapping fault processing. The system may comprise a memory storage and a processing unit coupled to the memory storage. The processing unit may be operative to execute code and to detect an exception during the code execution. In addition, the processing unit may be operative to schedule the exception in a queue and to perform one of the following: handling the exception and compensating for the exception.

Another embodiment consistent with the invention may comprise a system for providing mapping fault processing. The system may comprise a memory storage and a processing unit coupled to the memory storage. The processing unit may be operative to perform one of the following: handling an exception and compensating for the exception. The exception may be detected during execution of code on the processing unit. Performing the one of handling the exception and compensating for the exception may be performed asynchronously with the code execution.

Yet another embodiment consistent with the invention may comprise a system for providing mapping fault processing. The system may comprise a memory storage and a processing unit coupled to the memory storage. The processing unit may be operative to receive user selectable elements defining a process comprising a plurality of activities. In addition, the processing unit may be operative to produce code, based on the received user selectable elements, configured to implement the process. Moreover, the processing unit may be operative to execute the code, to detect an exception during the code execution, and to schedule the exception in a queue. Furthermore, the processing unit may be operative to perform one of the following: handling the exception and compensating for the exception. Handling the exception may comprise undoing a one of the plurality of activities that was partially completed and unsuccessful. Compensating for the exception may comprise undoing a one of the plurality of activities that was completed.

Figure 4:
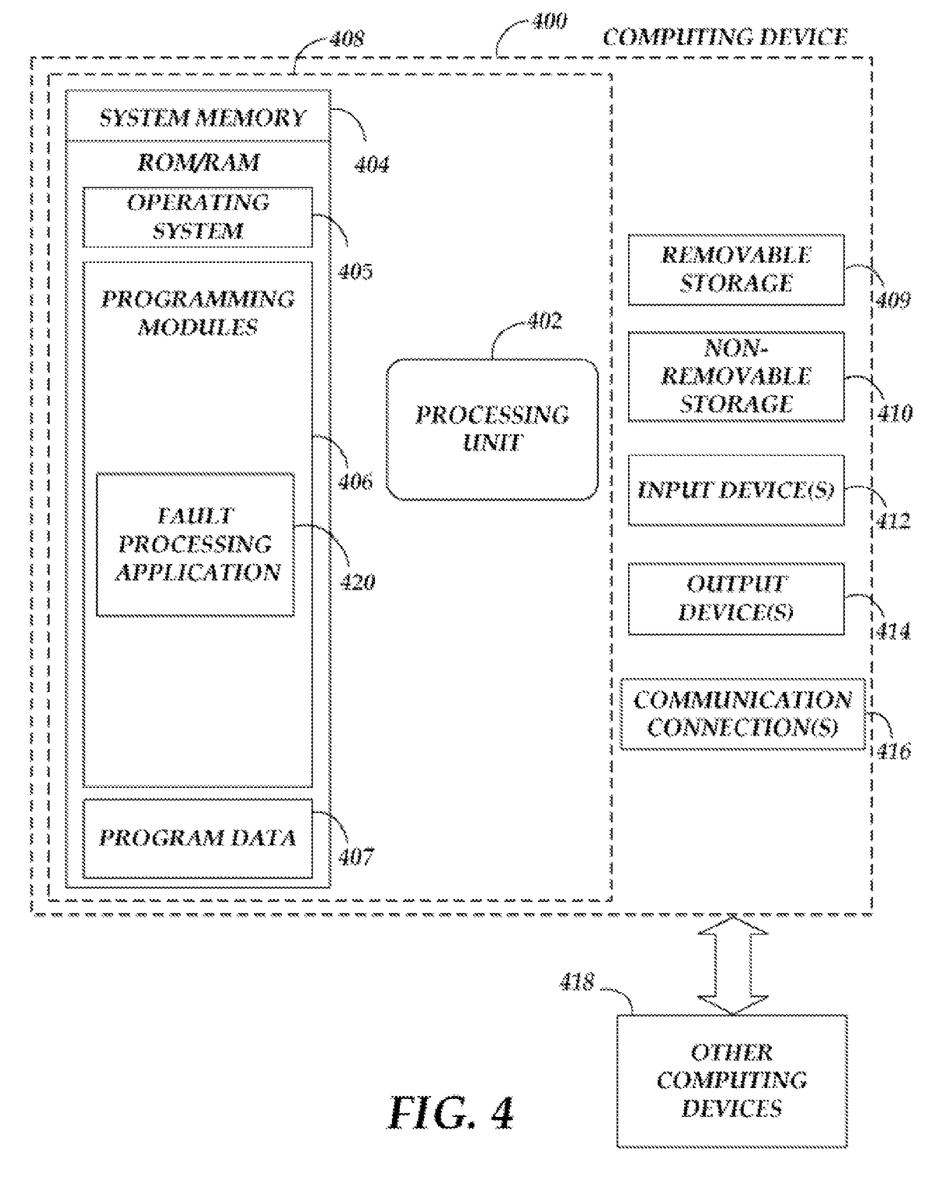
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400, in a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, a fault processing application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418 (e.g. backend 105), such as over a network in a distributed computing environment, for example, an intranet or the Internet. Communication connection 418 is one example of communication media. Communication media may typically be embodied by computer readable instructions, data structures, program modules, or other data in a modulated data signal, such as a earner wave or other transport, mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless, media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. fault processing application 420 may perform processes including, for example, one or more method 200's stages as described above. The aforementioned process is an example, and processing unit 402 may perform other processes. Other programming modules that may be used in accordance with embodiments of the present invention may include electronic mall and contacts applications, word processing applications, spreadsheet applications, database applications slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are inked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product, or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing mapping fault processing, the method comprising:
   receiving user selectable elements defining a process associating backend data with entity data, wherein receiving the user selectable elements defining the process comprises receiving the user selectable elements defining the process configured to allow data flow from a backend system to an entity model and between the entity model and the backend system;
   producing code, based on the received user selectable elements, configured to implement the process;
   executing the code;
   detecting an exception during the code execution;
   scheduling the exception in a queue; and
   performing, asynchronously with the code execution, one of the following: handling the exception and compensating for the exception wherein handling the exception comprises undoing a one of a plurality of activities that was partially completed and unsuccessful and wherein compensating for the exception comprises undoing a one of a plurality of activities that was completed.

2. The method of claim 1, wherein receiving the user selectable elements comprises receiving the user selectable elements defining the process comprising a plurality of activities.

3. The method of claim 1, further comprising receiving the backend data defining data constructs in the backend system.

4. The method of claim 3, wherein receiving the backend data defining data constructs in the backend system comprises receiving the backend data configured to define the backend system.

5. The method of claim 3, wherein receiving the backend data defining data constructs in the backend system comprises receiving the backend data configured to define how to access the backend system.

6. The method of claim 3, wherein receiving the backend data defining data constructs in the backend system comprises receiving the backend data defining data constructs in the backend system comprising one of the following: a conceptual model; a relational database; and a set of application program interfaces (APIs).

7. The method of claim 1, further comprising receiving the entity data defining data constructs in the entity model.

8. The method of claim 7, wherein receiving the entity data defining data constructs in the entity model comprises receiving the entity data defining data constructs comprising one of the following: entity classes and data logical classes.

9. The method of claim 1, wherein receiving the user selectable elements defining the process comprises receiving the user selectable elements defining the process configured to map to a database on the backend system.

10. The method of claim 1, wherein receiving the user selectable elements defining the process comprises receiving the user selectable elements defining the process configured to perform at least one data type transformation.

11. The method of claim 1, wherein receiving the user selectable elements defining the process comprises receiving the user selectable elements defining the process configured to perform at least one data type transformation comprising at least one of the following: strings to guides; integers to strings; concatenation of types; and a mathematical transformation.

12. The method of claim 1, wherein receiving the user selectable elements defining the process comprises receiving the user selectable elements defining a flow chart of the process.

13. The method of claim 1, wherein receiving the user selectable elements defining the process comprises receiving the user selectable elements defining a flow chart of the process comprising one of the following: a sequential process and a state machines process.

14. A computer-readable storage medium which stores a set of instructions which when executed performs a method for providing mapping fault processing, the method executed by the set of instructions comprising:
  receiving user selectable elements defining a process comprising a plurality of activities, wherein receiving the user selectable elements defining the process comprises receiving the user selectable elements defining the process configured to perform at least one data type transformation comprising at least one of the following: strings to guides; integers to strings; concatenation of types; and a mathematical transformation;
  producing code, based on the received user selectable elements, configured to implement the process;
  executing the code;
  detecting an exception during the code execution;
  scheduling the exception in a queue;
  performing one of the following: handling the exception and compensating for the exception wherein handling the exception comprises undoing a one of the plurality of activities that was partially completed and unsuccessful and compensating for the exception comprises undoing a one of the plurality of activities that was completed.

15. The computer-readable storage medium of claim 14, wherein receiving the user selectable elements defining the process comprises receiving the user selectable elements defining the process configured to allow data flow from a backend system to an entity model and between the entity model and the backend system.

16. A system for providing mapping fault processing, the system comprising:
  a memory storage; and
  a processing unit coupled to the memory storage, wherein the processing unit is operative to:
    receiving user selectable elements defining a process associating backend data with entity data, wherein receiving the user selectable elements defining the process comprises receiving the user selectable elements defining a flow chart of the process;
    producing code, based on the received user selectable elements, configured to implement the process;
    executing the code;
    detecting an exception during the code execution;
    scheduling the exception in a queue; and
    performing, asynchronously with the code execution, one of the following: handling the exception and compensating for the exception wherein handling the exception comprises undoing a one of a plurality of activities that was partially completed and unsuccessful and wherein compensating for the exception comprises undoing a one of a plurality of activities that was completed.

17. The system of claim 16, wherein the processing unit being operative to receive the user selectable elements comprises the processing unit being operative to receive the user selectable elements defining the process comprising a plurality of activities.

18. The system of claim 16, further comprising the processing unit being operative to receive the backend data defining data constructs in a backend system.

19. The system of claim 18, wherein the processing unit being operative to receive the backend data defining data constructs in the backend system comprises the processing unit being operative to receive the backend data configured to define the backend system.

20. The system of claim 18, wherein the processing unit being operative to receive the backend data defining data constructs in the backend system comprises the processing unit being operative to receive the backend data configured to define how to access the backend system.

* * * * *